(12) United States Patent
Junk

(10) Patent No.: US 8,813,940 B2
(45) Date of Patent: Aug. 26, 2014

(54) CONTAINER FILLING DEVICE

(75) Inventor: Martin Junk, Tholey (DE)

(73) Assignee: Hamba Filltec GmbH & Co. KG, Saarbruecken (DE)

( * ) Notice: Subject to any disclaimer, the term of this patent is extended or adjusted under 35 U.S.C. 154(b) by 115 days.

(21) Appl. No.: 13/472,699

(22) Filed: May 16, 2012

(65) Prior Publication Data

US 2013/0126298 A1    May 23, 2013

(30) Foreign Application Priority Data

May 25, 2011  (DE) .......................... 10 2011 103 256

(51) Int. Cl.
*B65G 33/04* (2006.01)
*B65B 65/02* (2006.01)
*B67C 3/24* (2006.01)
*B65G 35/08* (2006.01)
*B65B 43/52* (2006.01)
*B65B 43/54* (2006.01)
*B65B 9/04* (2006.01)

(52) U.S. Cl.
CPC . *B67C 3/24* (2013.01); *B65B 65/02* (2013.01); *B65G 35/08* (2013.01); *B65B 43/52* (2013.01); *B65B 43/54* (2013.01); *B65B 9/042* (2013.01)
USPC .................................. 198/339.1; 198/867.14

(58) Field of Classification Search
None
See application file for complete search history.

(56) References Cited

U.S. PATENT DOCUMENTS

| 3,910,404 A * | 10/1975 | Henrekson ..................... 198/835 |
| 6,170,634 B1 | 1/2001 | Jaquet |
| 6,398,538 B1 * | 6/2002 | Padovani ...................... 425/347 |

FOREIGN PATENT DOCUMENTS

| DE | 10100908 A1 | 7/2002 |
| EP | 0 995 700 A1 | 4/2000 |
| EP | 1 495 997 A1 | 1/2005 |

* cited by examiner

*Primary Examiner* — Kavel Singh
(74) *Attorney, Agent, or Firm* — Von Rohrscheidt Patents

(57) ABSTRACT

A device for filling containers, in particular bottles or beakers with food products, comprising: an upper main element, a lower main element which are the main elements of the device; lateral elements connecting the main elements; a plurality of support elements continuously arranged at one another without a continuous drive device and provided with receivers for the containers and moved through the device and along the elements and along operating stations; running rails on which the support elements rest while being moved through the main elements; a drive which moves the support elements at least along the operating stations; and at least one lateral element configured as an elevator through which the support elements alternate between the main elements when moving through the device, wherein the elevator includes a exclusively vertically movable lifting device for moving the support elements from one main element into another main element.

11 Claims, 6 Drawing Sheets

CONTAINER FILLING DEVICE

RELATED APPLICATIONS

This application claims priority from and incorporates by reference German patent application DE 10 2011 103 256.1 filed on May 25, 2011

FIELD OF THE INVENTION

The present invention relates to a device for filling containers, in particular bottles or beakers with food products, in particular liquid to paste-like dairy- and fat products, juices, waters and similar products. In an embodiment, the device includes an upper main element, a lower main element, lateral elements connecting the upper and lower main elements together, and a plurality of support elements arranged with one another without a continuous drive device. The support elements comprise receivers for the containers and may be moved through the filling device. The support elements may be moved along the main elements and through operating stations while resting on and supported by running rails on the upper main element and the lower main element. The device further comprises a drive which moves the support elements through the operating stations and at least one of the lateral elements is configured as an elevator through which the support elements move vertically between the main elements when running through the device.

BACKGROUND OF THE INVENTION

Filling devices of this type are illustrated e.g. in EP 1 495 997 B1. These filling devices are so-called chainless filling devices for food products. They are designated chainless filling devices in order to define them over the general art. In the prior art there are continuous drive filling devices, in particular configured as a chain at which the support elements are attached and are fed through the device.

In the art that is pertinent to the invention the invention and in which the recited EP 1 495 997 B1 is disposed, there is an arrangement of the support devices at one another in the broadest sense, at least in one of the main elements. Coupling of the support elements through a common endless drive device, however, is not provided.

EP 1 495 997 B1 instead describes a device in which the support elements with their faces oriented towards one another are arranged at one another and are pushed through at least one of the main elements without being connected. Thus, different drive modes are disclosed like e.g. a drive through a linear piston or a worm drive.

Besides closed lateral elements through which the cell plates are moved on arcuate rails from the upper main element into the lower main element and back, EP 1 495 997 B1 also illustrates two elevators forming the lateral elements in which the support elements are inserted into continuously circulating receivers and moved between the main elements.

The elevators illustrated in EP 1 495 997 B1 have a rather complex mechanical configuration, so there is a need for a filling device that provides a lateral element with a simpler configuration for a device configured as recited supra.

BRIEF SUMMARY OF THE INVENTION

Embodiments of the filling device comprise an elevator, wherein the elevator is a strictly vertically operating lifting device for moving the support elements from one main element to the other main element.

Embodiments of the device according to the invention operate without circulating receivers for the cell plates and thus, in particular, no rotating shafts or similar have to be provided.

A particular embodiment is characterized in that the components of the elevator are arranged outside a movement path of the support elements through the respective main element.

An elevator of this type significantly simplifies so-called format change, thus changing the support elements for filling other container types and sizes may be easily performed since the movement paths of the support elements in the main elements are freely accessible. Thus, the support elements can be retrieved or removed in a simple manner without being impeded by the elevator components and/or mechanisms at an end of the respective main element or they can be joined in a simple manner at the beginning of the respective main element. According to the invention, the lateral elements with their elevators do not impede retrieving the support elements at the lateral element.

Further, embodiments of the lifting device comprise running rail sections which are configured to be joined in the running rail planes of the main elements in order to receive the support elements.

In this embodiment, no retaining elements, that need to be produced separately and which have to receive the support elements, have to be used. Instead, the support element is moved out of the main element to continue its movement path without having to be joined to a separate device.

In order to provide a clean axial orientation of the support elements with respect to a longitudinal axis of the device on a path of the support elements between the main elements and for respective rejoining and in order to assure that the support element can be moved with precise positioning between the main elements, the elevator may include a guide device which provides a precisely positioned arrangement of a support element in the elevator during the vertical movement.

In a particular embodiment, the guide device is configured as a vertical rail in which a positioning pin of the support element engages during the vertical movement of the lifting device.

In order to provide joining of the support elements from the lateral elements into the main elements for the high cyclic rates of a filling device of this type for food products, the elevator includes a support device which supports a support element in a horizontal alignment for joining in a main element without the support of a lifting device.

Thus, the support element may be ready to be joined in the main element and the elevator, however, can be moved again to the other main element for receiving the next support element.

In particular embodiments, the retaining device is a U-rail which retains the support element in a vertical position for being joined in a main element.

In a particular embodiment, the elevator supports the drive for feeding the support elements through a main element. In particular, when the drive includes an operating element which simultaneously moves a support element to a main element and may move other support elements through the same main element.

In still further embodiments, the operating element may be a gear that is fixed in place and whose axis of rotation is arranged in the vertical separation plane between a main element and a lateral element.

This facilitates that the support element is moved through the lifting device from below relative to the placement surface of the device to the operating element of the drive.

BRIEF DESCRIPTION OF THE DRAWINGS

An improved understanding of the invention and of additional advantages and features can be derived from the subsequent description of an embodiment with reference to drawing figures wherein.

DETAILED DESCRIPTION OF THE INVENTION

Figure 1:
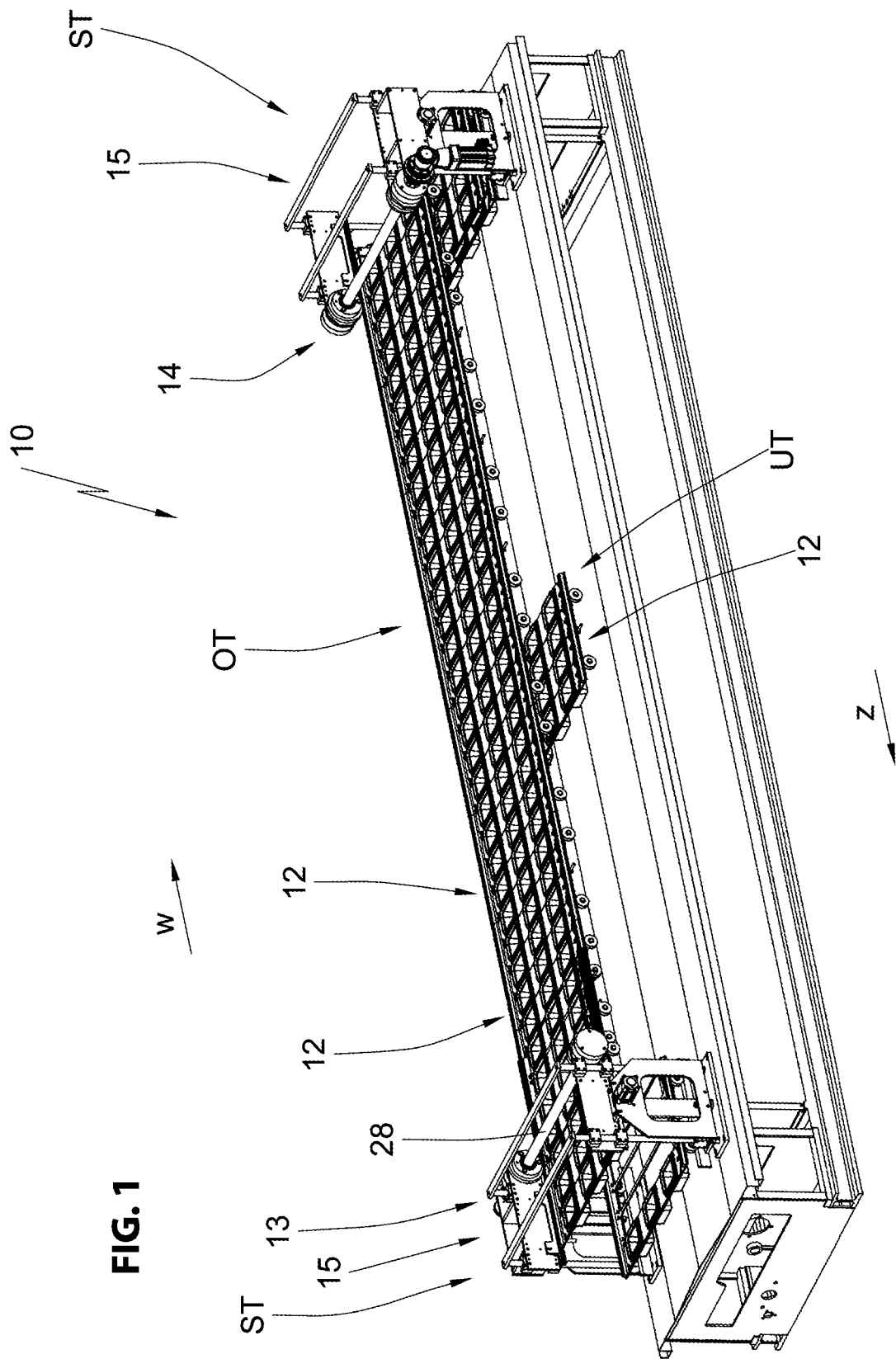
FIG. 1 illustrates an overview of the device according to the invention.

A device according to the invention is designated in the figures with the overall reference numeral 10.

The device 10 is used for filling liquid to pasty food products into containers 11 which are run through the device 10 on support elements which are overall designated with the reference numeral 12 along operating stations that are not illustrated.

The device 10 comprises an upper main element OT oriented horizontally with respect to the placement surface of the device 10 and a lower main element UT arranged parallel to the upper main element. Typically, operating stations for treating the containers 11 are arranged above the upper main element OT, however there are also systems where the operating stations are arranged between the upper main element OT and lower main element UT and the containers 11 are treated in the lower main element UT. Therefore, the upper main element OT and the lower main element UT can both be described as main elements.

In order to provide a circulation of the support elements 12, they may be moved through the lateral elements ST between the main elements. The support elements 12 run through the device 10 illustrated in FIG. 1, e.g. from the left main element ST which is provided with a drive 13 in feed direction W to the right lateral element ST which includes a brake device 14. The drive 13 and the brake device 14 define the upper main element OT.

The support elements 12 then reach the lower main element UT through the right lateral element ST which is configured as an elevator 15 described infra. From there the support element 12 is moved back to the left lateral element ST and vertically moved to the level of the upper main element OT through the elevator 15 and joined into the upper main element OT.

Figure 6:
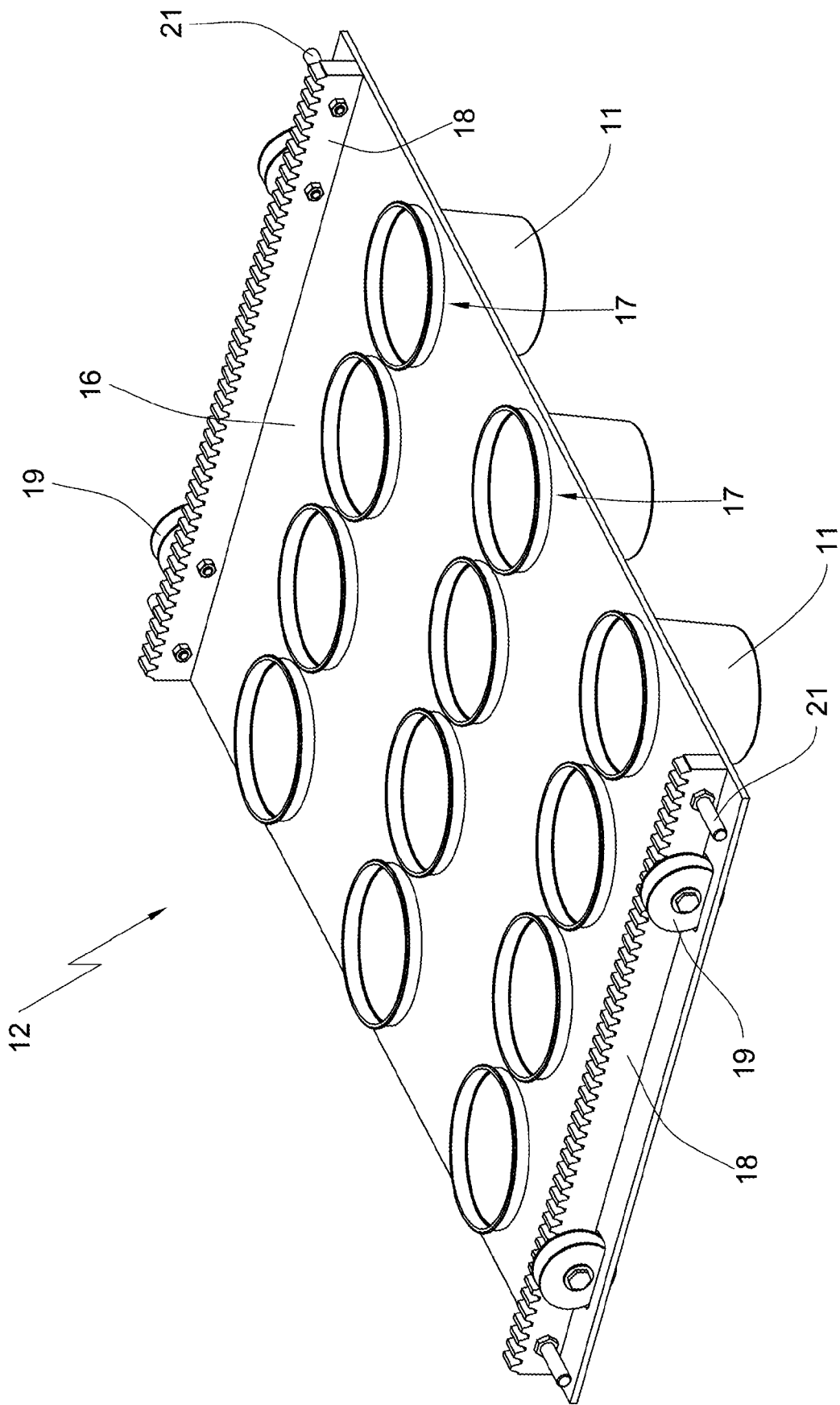
FIG. 6 illustrates a view of the support element.

FIG. 6 illustrates a support element of the device 10 designated overall with the reference numeral 12. In the present embodiment, the support element includes a cell plate 16 which includes a plurality of receivers 17 for the containers 11. In the shown embodiment, the receivers 17 are arranged parallel to the feed device W in rows adjacent to one another and arranged in feed direction W in paths behind one another.

The support element 12 furthermore includes gear racks 18 mounted on the cell plate 16 in which the drive 13 engages to move the support element 12 in feed direction W. The brake device 14 engages gear racks 18 in order to be able to decelerate the cell plate interconnection that is arranged in FIG. 1 in the upper main element OT in a controlled manner.

The gear rack 18 further may include rollers 19 on which the support element 12 is moved on running rails 20 through the device 10. Further, the gear racks 18 may also include positioning pins 21 which are subsequently described in more detail.

Figure 2:
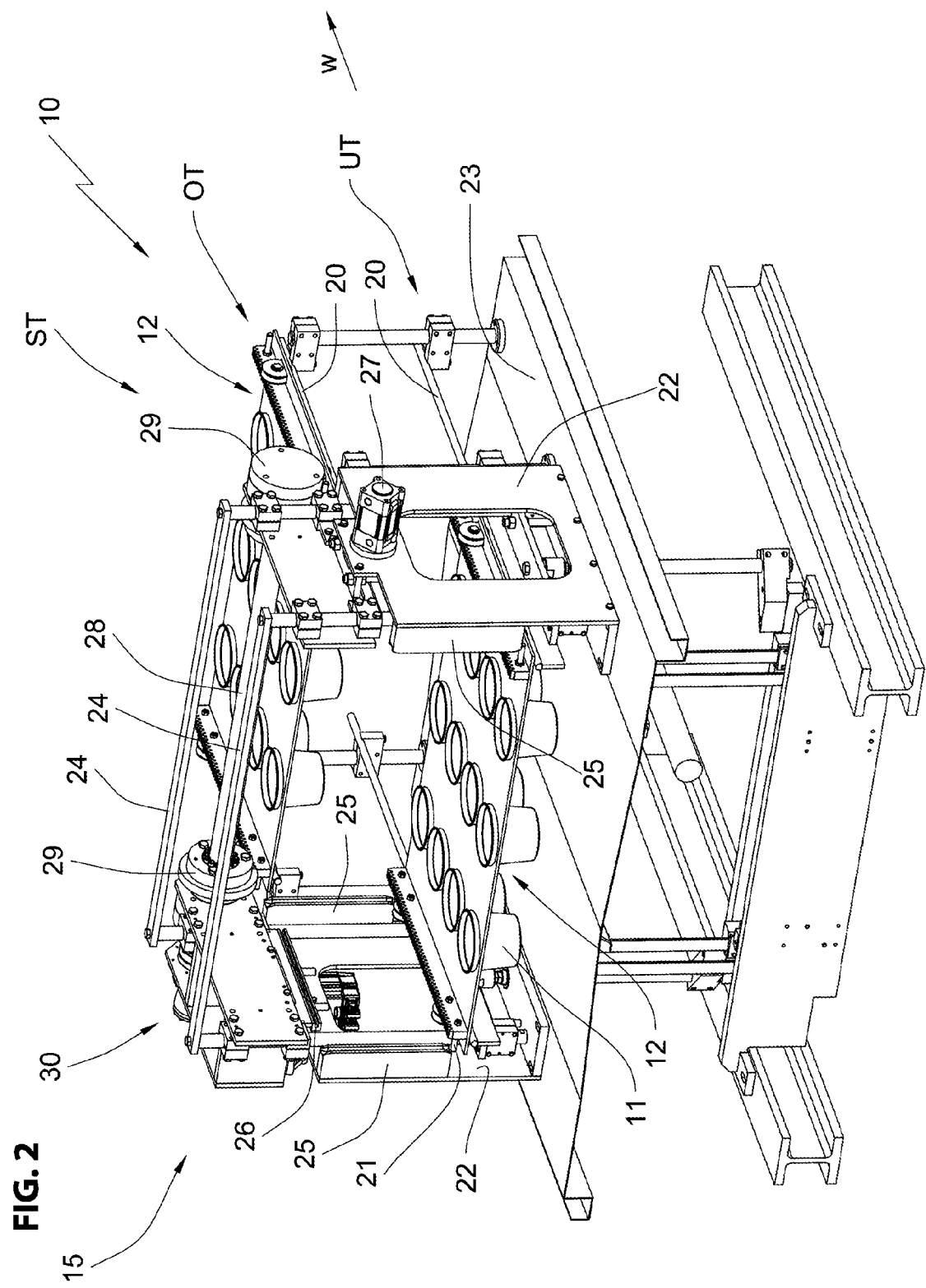
FIG. 2 illustrates a partial view of the device according to FIG. 1 of an elevator forming a lateral element.
Figure 3:
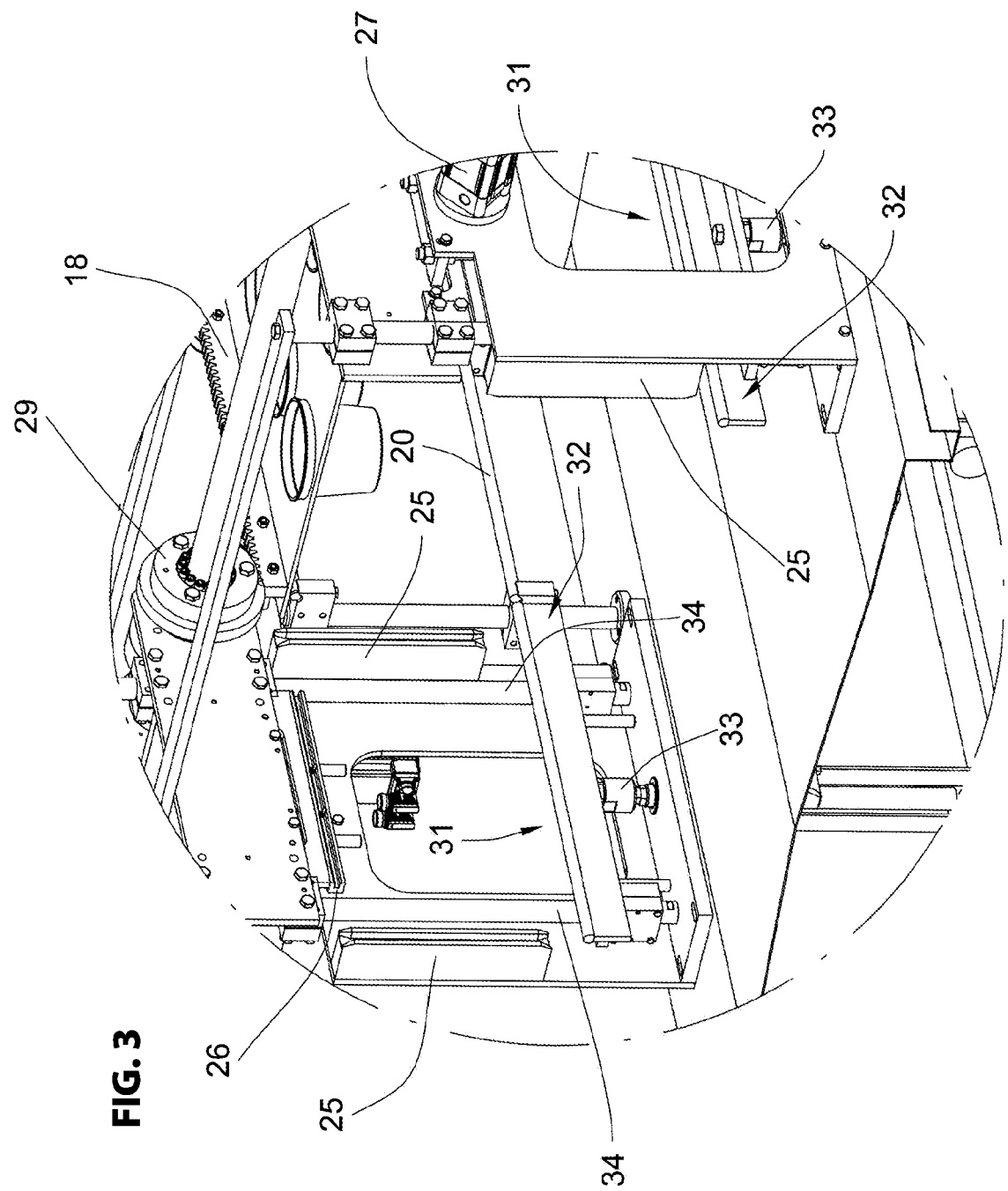
FIG. 3 illustrates a detailed view of the elevator according to FIG. 2.

FIG. 2 illustrates a partial view of the device 10 primarily illustrating the portion of the left lateral element ST illustrating its elevator designated overall as 15.

The elevator 15 is approximately configured as a gate or as a frame and comprises two lateral lobes 22 which are attached standing upright at a machine table 23 and connected with one another through stabilization bars 24. Between the machine table 23 and the stabilization bar 24 the upper element OT and the lower element LIT are arranged with their running rails 20.

As can be derived from FIG. 2, the running rails 20 of the upper main element OT and the lower main element UT are arranged within the frame contour formed by the lateral lobes 22, so that the movement track formed by the running rails 20 of upper main element OT and lower main element UT of the support elements is also clear in the lateral element formed by the elevator 15.

The elevator 15 furthermore includes support devices in the form of vertical rails 25 arranged outside of the movement track of the support elements 12. The vertical rails 25 extend along the movement track of the support element 12 between the lower main element UT and the upper main element OT. Also retention devices configured as horizontal rails 26 are part of the elevator 15. The retention devices are arranged in the plane of the cell plates 16 in the upper main element OT and movable in a direction towards the movement path of the support elements 12. For this purpose they are provided with actuators 27 arranged on the outside at the side lobes 22.

The side lobes 22 may further support a drive axle 28 at which gears 29 are arranged in the portion of each side lobe 22. The gears 29 arranged on the axle 28 are brought into rotation through a motor 30 and engage the gear racks 18 of the support element 12 of the upper main element OT and of the lateral element ST when the support element 12 of the lateral element ST is arranged in the plane of the upper main element OT. The gears 29 move the support element 12 onto the upper main element OT and also the support element 12 arranged in the lateral element ST in the plane of the upper main element OT in feed direction W.

The lifting device of the elevator is designated overall with the reference numeral 31 and includes, in a particular embodiment, two running rail sections 32 which are respectively coupled with one lifting piston 33 each. The running rail sections 32 are arranged in a plane defined by the running bars 20 of the upper main element OT and the lower main element UT, so that they are arranged in alignment depending on a vertical position either with the running rails 20 of the upper main element OT or the running rails 20 of the lower main element UT. For safe vertical support of the running rail sections 32 through the lifting pistons 33, the running rail sections 32 are supported at vertical struts 34.

Figure 4:
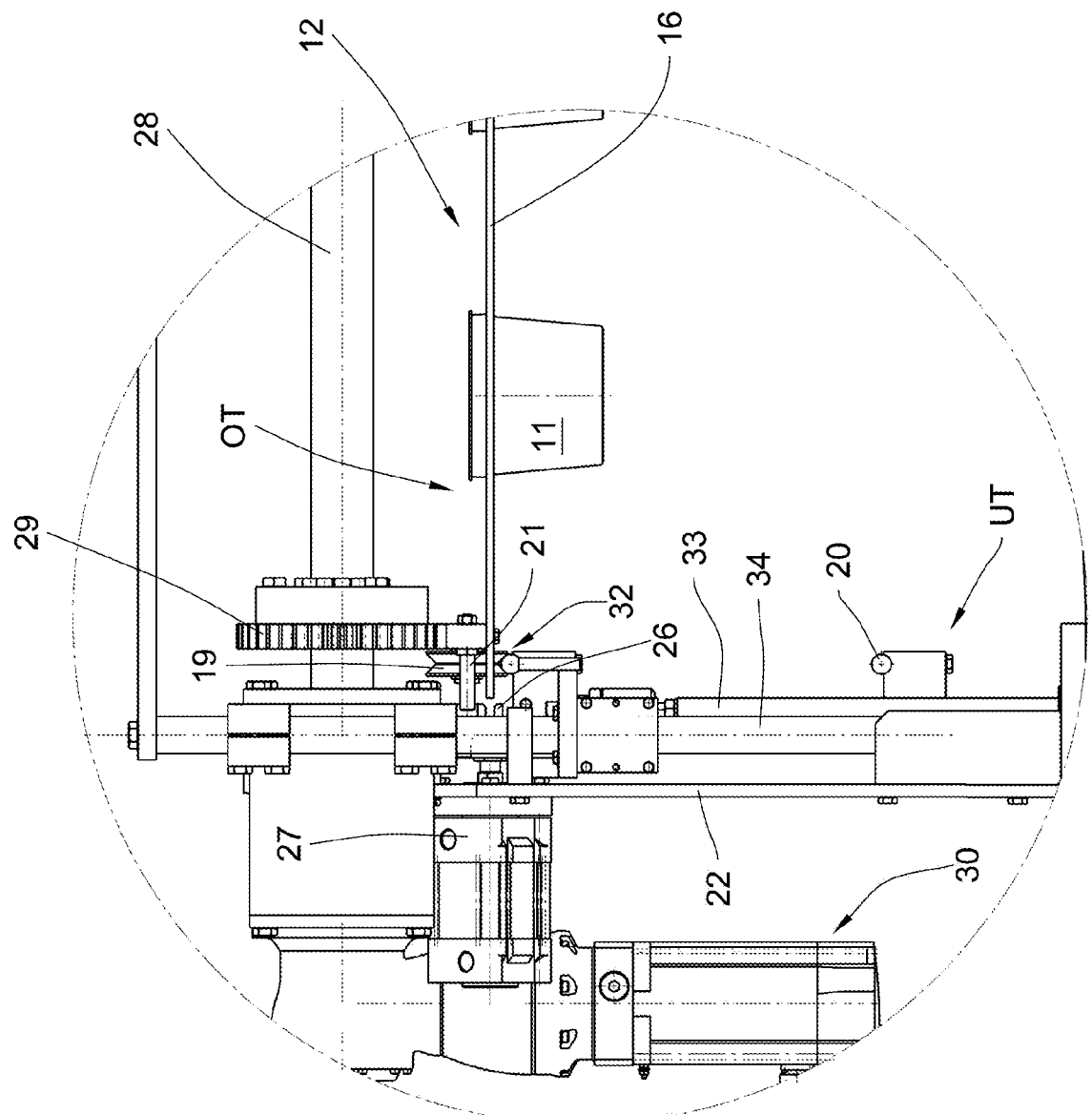
FIG. 4 illustrates a detail view of the elevator according to FIG. 2 with a open retention device.

FIG. 4 illustrates another enlarged detail of the elevator 15. The running rail section 32 is aligned in feed direction W in front of the associated running rail of the upper main element OT in the lateral element ST. The feed direction W extends in FIG. 4 orthogonal to the paper plane. As shown, a support element 12 is placed with its rollers 19 on the running rail section 32. The lifting device 31 has moved the support element 12 into the plane of the upper main element OT in the illustration of FIG. 4. The cell plate 16 is aligned with the receiving recess of the U-shaped horizontal rail 26. The running rail 20 of the lower main element UT is visible below the running rail section 32.

Figure 5:
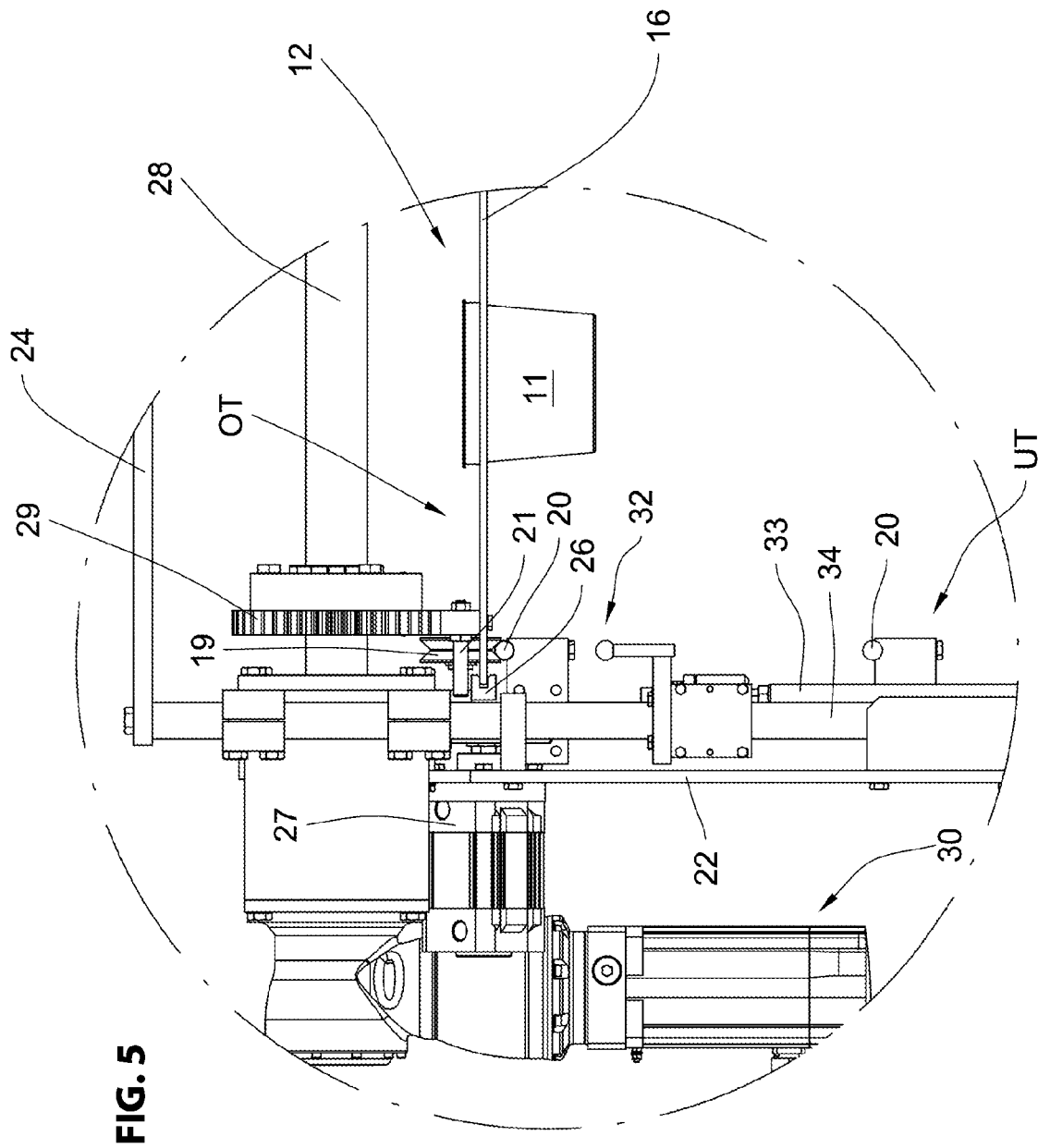
FIG. 5 illustrates a view according to FIG. 4 with a closed retention device.

The illustration of FIG. 5 essentially corresponds to the illustration of FIG. 4. A difference over FIG. 4 is that the actuation cylinder 27 has deployed and has moved the horizontal rail 26 against the lateral portions of the cell plate 16 arranged parallel to the feed direction. Thus, the horizontal rail 26 may receive the cell plate 16 in its receiving recess and retain it in the plane of the upper main element OT. Thus, the running rail section 32 may be moved in a direction towards the lower main element UT by the lifting pistons 33 without the illustrated support element 12 already being included in the upper main element OT. This is illustrated according to FIG. 5 so that the running rail 20 is visible now in the upper main element OT, wherein the running rail 20 was still covered in FIG. 4 through the aligned running rail section 32.

The function of the device, in particular of the elevator is described infra.

As recited supra, the support elements 12 initially run on rollers 19 through the upper main element OT starting with the drive 13 in feed direction W up to the brake device 14. The drive 13, more precisely the drive axle 28 and the brake device 14 with its drive axle, not described in more detail, form the beginning and the end of the upper main element OT. The support elements 12 are moved by the drive 13 against the brake device 14 into the right lateral element ST of FIG. 1 which includes an elevator 15 which is configured analogous to the described elevator 15 of the drive side lateral element ST. In front of this elevator 15, the support elements 12 are moved vertically downward into the lower element UT and run therein through a feed device, that is not described in more detail, like e.g. a timing belt, in feed direction z to the left lateral element ST. The left elevator 15 moves the support elements 12 vertically back into the plane of the upper main element 13, in which they are joined again with the upper main element OT through the drive 13.

In the elevator 15 the support elements 12 are arranged on the running rail sections 32 of the lifting device 31, wherein the running rail sections 32 are separated from the running rails 20. The positioning pins 21 are arranged in alignment with the vertical rails 25 as apparent in particular from FIG. 2.

Now the support element 12 arranged in FIG. 2 in the plane of the lower main element UT has to be moved into the plane of the upper main element OT. Thus, the lifting device 31 moves vertically upward towards the upper main element OT, the positioning pins 21 engage the vertical rail 25 so that an orientation of the support element 12 in the lateral element ST is aligned with the longitudinal axis of the device 10.

When the support element 12 is arranged in the plane of the upper main element OT the cell plate 16 is horizontally aligned with the horizontal rails 26 (c.f. FIG. 4). In the next step the actuation cylinders 27 move the horizontal rail 26 so that its receiving recesses enclose the cell plate 16 and support it in the plane of the upper element OT. The lifting device 31 now moves the running rail sections 32 back into the plane of the lower main element UT (c.f. FIG. 5). At this point in time the support element 12 supported in the plane of the upper main element OT in the lateral element ST is not on the upper main element OT.

The joining may then be performed in the next step, the gear 29 of the drive 13 is rotated and moves the support element 12 onto the upper main element OT. As apparent in the embodiment shown in FIG. 1, the respective feed movement of a support element 12 from the lateral element ST into the upper main element OT moves the support elements arranged in the upper main element OT forward in feed direction W. The support element in front of the brake device 14 is pushed into the lateral element ST arranged after the brake device 14.

Lowering of the support element into the lower main element UT is then performed reversely. The running rail sections 32 should already be located in the plane of the upper main element OT at the point in time when the support element 12 enters the lateral element ST provided with the brake device 14. The support element 12 now contacting the running rail section 32 in this location is moved vertically downward into the plane of the lower main element UT, wherein axial alignment is provided through the vertical rails 25. In the lower main element UT, a feed device that is not illustrated in more detail, for example, a timing belt may pull the support element 12 back to its starting point in the drive side lateral element ST.

In addition to having a rather simple configuration, the elevator 15 of the lateral elements ST is in particular characterized in that no components are arranged in the movement paths of the support elements 12 in the upper main element OT or the lower main element UT. Consequently, the support elements can be extracted in a quick and simple manner at the lateral elements ST and can be replaced with support elements of different types and qualities. Thus, a so called format change in which the device 10 is retro-fitted for filling different containers can be facilitated in a quick and simple manner.

REFERENCE NUMERALS AND DESIGNATIONS 10 device
11 container
12 support element
13 drive
14 brake device
15 elevator
16 cell plate
17 receiver
18 gear rack
19 rollers
20 running rail
21 positioning pin
22 lateral lobe
23 machine table
24 stabilization bar
25 vertical rail
26 horizontal rail
27 actuation cylinder
28 drive axle
29 gear
30 motor
31 lifting device
32 running rail section
33 lifting piston
34 vertical strut
OT upper main element
UT lower main element
ST lateral element
w direction
z direction

What is claimed is:
1. A device for filling containers with food products, comprising:
   an upper main element, wherein the upper main element includes at least one running rail;
   a lower main element, wherein the lower main element includes at least one running rail;

a plurality of support elements including receivers for containers, wherein the support elements are arrangeable adjacent to one another without a continuous drive device in the upper main element and in the lower main element respectively and moved along the running rail of the upper main element and the lower main element;

a drive which moves the support elements at least along the upper main element; and at least one lateral element connecting the upper main element and the lower main element, wherein the at least one lateral element includes an elevator through which the support elements are moved between the upper main element and the lower main element, wherein the elevator includes an exclusively vertically movable lifting device for moving the support elements from the lower main element to upper main element.

2. The device according to claim 1, wherein the elevator includes horizontal running rail sections which are movable into a plane of the running rails of each of the upper main element and the lower main element for receiving the support elements.

3. The device according to claim 1, wherein the elevator includes at least one guide device which provides a fixed positional arrangement of a support element in the elevator during the vertical movement of the support element.

4. The device according to claim 3, wherein the guide device is configured as a vertical rail in which a positioning pin of the support element engages during the vertical movement of the lifting device.

5. A device for filling containers with food products, comprising:

an upper main element, wherein the upper main element includes at least one running rail;

a lower main element, wherein the lower main element includes at least one running rail;

a plurality of support elements including receivers for containers, wherein the support elements are arrangeable adjacent to one another without a continuous drive device in the upper main element and in the lower main element respectively and moved along the running rail of the upper main element and the lower main element;

a drive which moves the support elements at least along the upper main element; and at least one lateral element connecting the upper main element and the lower main element, wherein the at least one lateral element includes an elevator through which the support elements are moved between the upper main element and the lower main element, wherein the elevator includes an exclusively vertically movable lifting device for moving the support elements from the lower main element to upper main element, wherein the elevator includes a retention device which retains the support element in a horizontal orientation for joining with either the upper main element or the lower main element also without being supported by the lifting device, and wherein the retention device is a U-rail which retains the support element in a vertical position for joining with either the upper main element or the lower main element.

6. The device according to claim 1, wherein the lifting device supports the drive for feeding the support elements through the upper main element or the lower main element.

7. The device according to claim 6, wherein the drive includes an operating element which simultaneously engages and moves a support element onto one of the upper main element or the lower element and moves the remaining support elements through the same main element.

8. The device according to claim 7, wherein the operating element is a gear that is fixed in place, whose axis of rotation is arranged in a vertical separation plane between either the upper main element or the lower main element and a lateral element.

9. The device according to claim 7, wherein the support element is moved to the operating element of the drive by the elevator from below with respect to an installation surface of the device.

10. The device according to claim 1, wherein the components of the elevator are arranged outside of a movement path of the support elements on either the upper main element or the lower main element.

11. A device for filling containers with food products, comprising:

an upper main element, wherein the upper main element includes at least one running rail;

a lower main element, wherein the lower main element includes at least one running rail;

a plurality of support elements including receivers for containers, wherein the support elements are arrangeable adjacent to one another without a continuous drive device in the upper main element and in the lower main element respectively and moved along the running rail of the upper main element and the lower main element;

a drive which moves the support elements at least along the upper main element; and at least one lateral element connecting the upper main element and the lower main element, wherein the at least one lateral element includes an elevator through which the support elements are moved between the upper main element and the lower main element, wherein the elevator includes an exclusively vertically movable lifting device for moving the support elements from the lower main element to upper main element, wherein the elevator includes a retention device which retains the support element in a horizontal orientation for joining with either the upper main element or the lower main element also without being supported by the lifting device.

* * * * *